United States Patent [19]

Fryer

[11] 4,446,340

[45] May 1, 1984

[54] CUSTOMER PREMISES LOOP TEST UNIT POWERED FROM THE NORMAL CENTRAL OFFICE POWER SOURCE

[75] Inventor: Warren R. Fryer, New York, N.Y.

[73] Assignee: Calculagraph Company, East Hanover, N.J.

[21] Appl. No.: 371,080

[22] Filed: Apr. 23, 1982

[51] Int. Cl.³ .............................................. H04B 3/46
[52] U.S. Cl. ............................. 179/175.3 R; 179/2 A
[58] Field of Search ................. 179/175.3 R, 175.3 F, 179/2 A, 17 B, 81 R, 84 VF

[56] References Cited

U.S. PATENT DOCUMENTS 3,852,537 12/1974 Vincent ..................... 179/175.3 R
3,912,882 10/1975 Beerbaum ................ 179/175.3 R Primary Examiner—Stafford D. Schreyer
Attorney, Agent, or Firm—Rudolph J. Jurick

[57] ABSTRACT

A loopback circuit for use in testing a telephone line between the central office and a subscriber's equipment. The loopback circuit is located at the subscriber's end of the line and is powered solely by the normal central office power source.

4 Claims, 2 Drawing Figures

CUSTOMER PREMISES LOOP TEST UNIT POWERED FROM THE NORMAL CENTRAL OFFICE POWER SOURCE

BACKGROUND OF THE INVENTION

Telephone lines not only function to convey voice signals but are now widely used for data transmission in conjunction with teleprinters, computers and other data processing or terminal equipment. When trouble is encountered in the use of customer equipment connected to a telephone line, the cause of the trouble is not readily apparent. The telephone line may be the source of problem and, therefore, must be tested by itself. This testing generally requires a telephone repairman at the customer's premises in order to physically disconnect the customer equipment and insert a known test impedance across the line for test purposes. If the line is found to be in proper operating order the fault lies in the customer's equipment and if such equipment is owned by the customer it is his responsibility to make necessary repairs.

In the event operating trouble developes in the customer's equipment it would be highly desirable if the telephone company could determine the location of the trouble without sending a repair crew to the customer's premises and without disturbing the customer. The following U.S. Pat. Nos. disclose systems directed toward this end: 3,739,107, issued June 12, 1973 to Lucian W. Spencer, 3,843,848, issued Oct. 22, 1974 to Russel G. Cox, 3,912,882, issued Oct. 14, 1975 to Ronald H. Beerbaum.

In each of the arrangements disclosed in the above patents, power for operation of the loop back system is obtained from the customer's premises or from a secondary battery charged from loop power and connected to the system at all times. The customer pays for the power in the former case and in the latter case the battery imposes service requirements. Many customers find such systems to be objectionable and, consequently, such systems have not met with general acceptance.

In applicant's system, operating power is obtained from the 48 volt battery normally available at the central office. The system does not require an auxiliary battery or any other component that could require replacement after a period of time.

U.S. Pat. No. 3,636,280, issued Jan. 18, 1972 to Louis E. Wetzel, discloses an arrangement in which a 130 volt battery provides power for operation of a loop back circuit. This battery is available in some central offices for coin telephone station operation. However, operation from this 130 volt d.c. source presents the following problems:

1 -many central offices do not have the 130 volts available,
2 -the high voltage applied to the subscriber's loop presents a hazard, and
3 -a metallic path must exist from the test position in the central office to the subscriber's location.

SUMMARY OF THE INVENTION

A subscriber's loop test unit made in accordance with this invention operates in three modes, operating power being obtained from the normal 48 volt d.c. power supply located in the central office. In the Idle Mode the circuit is not connected to the loops d.c. power so that no power is being consumed. In the Monitoring Mode, the circuit is connected to loop d.c. power as a result of receiving a.c. signal energy within a relatively wide frequency band at adequate level. The circuit switches from the Monitoring Mode to the Loopback Mode after it has detected a specific enabling frequency within a relatively narrow band for a predetermined time period. In the Loopback Mode the subscriber's station equipment is disconnected from the telephone line and the line is terminated for transmission tests from the central office. The circuit remains in the Loopback Mode for a predetermined period of time, say about one minute, after which it automatically reverts to the Idle Mode.

An object of this invention is the provision of an improved remote loopback terminating system adapted for testing the condition of a subscriber's loop between the central office and the demarc to the customer's equipment.

An object of this invention is the provision of a system responsive to signals transmitted over a telephone line for disconnecting a subscriber's apparatus from the line and terminating the line for line-transmission tests made from the central office, which system is powered by the normal central office battery.

An object of this invention is the provision of an improved system for remotely testing the condition of a subscriber's loop between the central office and the demarc to the customer's equipment, which system is connected to loop d.c. power upon receipt of a first signal transmitted over telephone line and which system disconnects the customer equipment from the line and connects an impedance across the line upon receipt of a second signal transmitted over the line and having a predetermined time duration.

The above stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

DETAILED DESCRIPTION OF THE INVENTION

Figure 1:
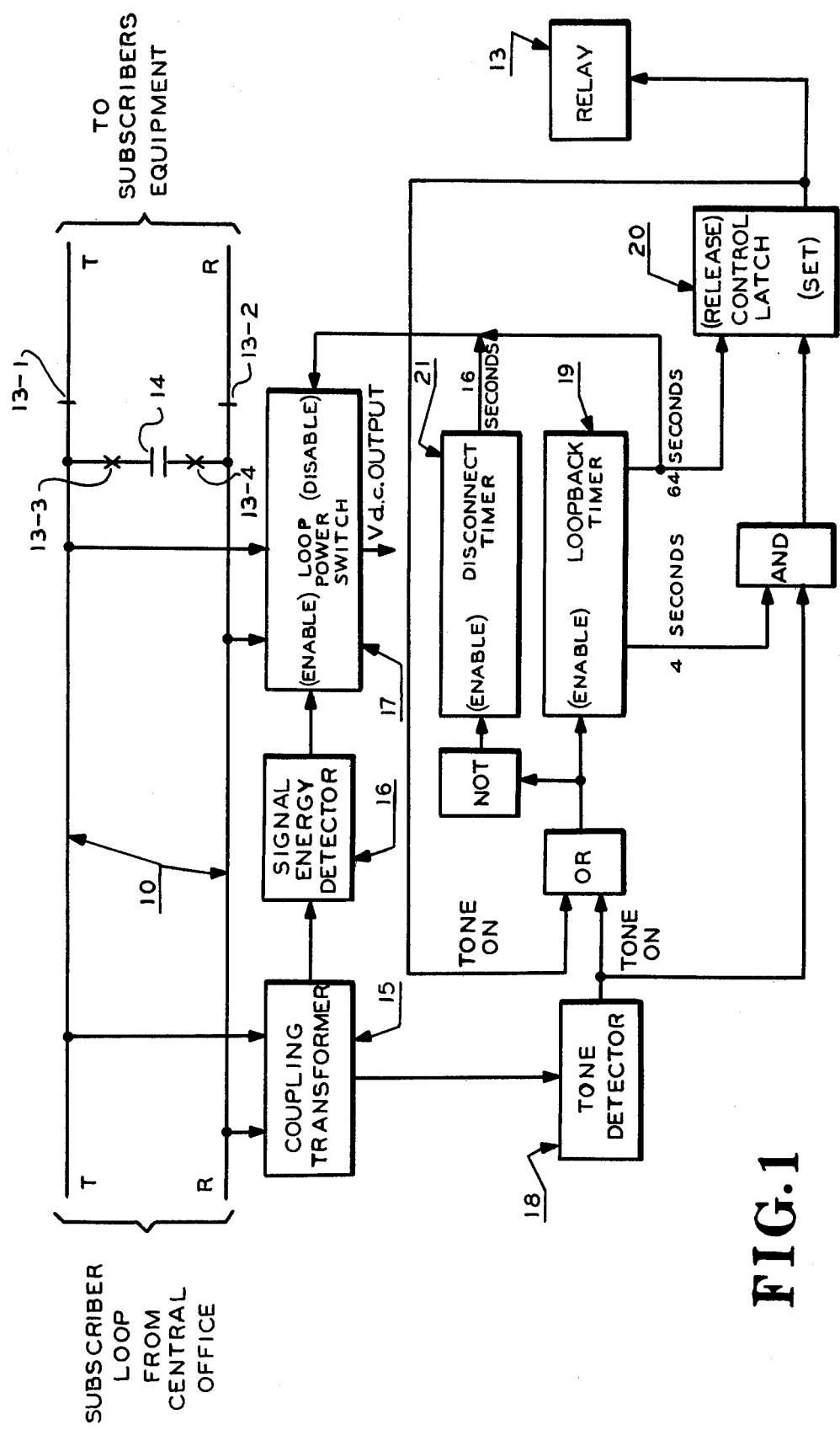
FIG. 1 is a functional block diagram of a loopback system made in accordance with this invention.

Referring to FIG. 1, the numeral 10 identifies a telephone subscriber's loop having a tip line and a ring line extending between the central office and a subscriber's equipment. The relay 13 has a pair of normally-open and a pair of normally-closed contacts. When the relay is deenergized the normally-closed contacts 13-1 and 13-2 complete the tip and ring lines to the subscriber's equipment. When this relay is energized, the subscriber's equipment is disconnected from the line and the capacitor 14 is connected across the line by the now-closed relay contacts 13-3 and 13-4.

The loopback circuit is coupled to the telephone line by a coupling transformer 15 and normally presents a very high impedance. This is the Idle Mode of the equipment. As the circuit is not connected to the loop's d.c. power, no power is being consumed. Upon receiving a.c. signal energy within a 1.5 KHz band at adequate level, the signal energy detector 16 enables the loop power switch 17 which connects the system to the central office battery through a relatively high impedance, less than 3 milli amperes being required for circuit operation. This is the Monitoring Mode of the circuit. The circuit enters the Loopback Mode after the tone detector 18 has detected a specific enabling frequency of say, 2725 Hz. The output of the tone detector enables the loopback timer 19 and if the enabling frequency is still present when this timer reaches its 4 second count, the control latch 20 is turned on, thereby energizing the relay 13, which disconnects the subscriber's equipment from the line and terminates the line by the capacitor 14. Once the loopback timer 19 has been enabled, the control latch 20 remains turned on until the 64 second count is reached (60 seconds from the end of the 4 second enabling tone). For the 60 seconds that the relay is energized, tests can be conducted over the loop from the central office. At the end of the 60 second loopback interval, the control latch 20 is released, the relay 13 is deenergized and the loop power switch 17 is disabled, that is, the system reverts to the Idle Mode. If the required enabling tone is not received within a nominal 20 seconds of the time that the signal energy detector 16 enables the loop power switch 17, the disconnect timer 21 disables the loop power switch, to return the circuit to the Idle Mode. The times given are nominal because they are affected by the central office battery voltage and subscriber's loop resistance encountered in a specific application.

Figure 2:
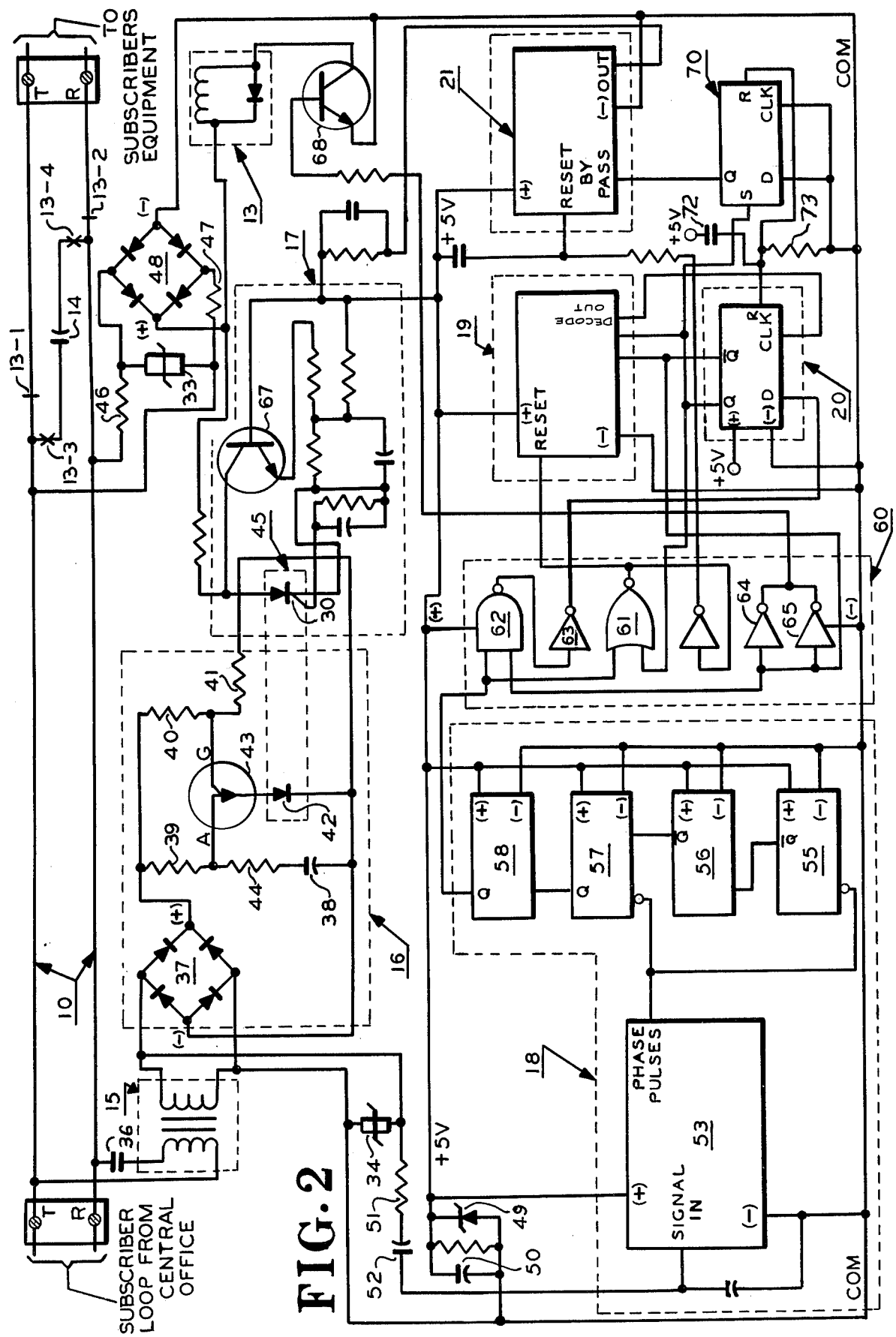
FIG. 2 is a schematic circuit diagram thereof.

Reference now is made to FIG. 2, wherein the broken-line blocks are identified by reference numerals corresponding to those which identify similar blocks in FIG. 1. The central office power supply normally is a 48 volt battery connected to the subscriber's loop through a series resistance of 400 ohms, and the subscriber loop resistance typically is 500-1,000 ohm. The loop voltage at the point where the loopback circuit is connected to the telephone line is prevented from energizing the tone detector 18, timers 19 and 21, and the loopback relay 13 by the normally-off condition of the optically-coupled silicon controlled rectifier 30 and the transistors 67 and 68. In this condition the circuit is in the idle mode and no current is being consumed. The zener diodes 33 and 34 protect the circuit from line over-voltage transients.

When a signal of adequate level, nominally above −2dBm, and within the band of nominally 1.5KHz to 3KHz is coupled via capacitor 36 and transformer 15 to the full-wave rectifier 37 the resulting output of the rectifier charges capacitor 38 via resistor 39. At the same time, the output voltage of the rectifier is applied via voltage divider resistors 40, 41 to the gate of a programmable unijunction transistor 43. When capacitor 38 charges to the extend that the voltage on the anode of transistor 43 exceeds the voltage on the gate, this transistor fires, discharging capacitor 38 via resistor 44 through the diode 42 of the opto-isolator 45. When the SCR 30 goes on, loop d.c. power is applied via dropping resistors 46 and 47 and the full-wave bridge 48 to the tone monitoring and timing circuits. This puts the circuit in the tone-monitoring mode. The bridge 48 makes the circuit insensitive to the polarity of the central office power connection, the zener diode 49 regulates the applied voltage and the capacitor 50 provides filtering.

The enabling tone is applied via capacitor 36, transformer 15, resistor 51 and capacitor 52, to the input of the phase-locked loop (PLL) integrated circuit 53. When the incoming signal is within the frequency band to which the phase-locked loop is tuned, the phase pulses out of the integrated circuit are less than a prescribed width. Monostable multivibrators 55-58 monitor the width of these phase pules and when the incoming tone corresponds to the predetermined enabling frequency, the final monostable 58 is triggered every cycle. Its period is slightly more than the period of a cycle at the enabling frequency so that its output is high whenever the incoming signal corresponds to the enabling frequency. The operation of the monostables is as follows. The first monostable is adjusted to provide an output for every negative-going transition of the low-going phase pulses. The first monostable's output pulse width is adjusted for the maximum acceptable phase pulse width from the PLL when the incoming frequency is within the enabling frequency band. (This is then an adjustment for the enabling frequency bandwidth.) The second monostable provides a narrow triggering pulse for the third monostable at the positive-going transition (end of output pulse) of the first monostable. If the low-going phase pulse is high, and therefore ended, when the triggering pulse for the third monostable arrives, the third monostable will be triggered providing a narrow triggering pulse for the fourth monostable. If the phase pulse is low (still present), the third monostable will be inhibited from triggering.

Operation of the loopback timer 19, the disconnect timer 21 and the control latch 20 are controlled by gates shown enclosed within the broken-line block identified by the reference numeral 60. The NOR gate 61 normally keeps the loopback timer 19 reset. When the tone signal is high, this timer is allowed to advance. The NAND gate 62 followed by an inverter 63 will cause the control latch 20 to be enabled if the tone signal is high enough for the loopback timer 19 to reach a count corresponding to a nominal 4 second interval (indicating at least 4 seconds of applied enabling tone). When the control latch is enabled, a parallel pair of inverters 64, 65 buffer the latch output and provide base drive to transistor 68, turning it on and operating relay 13. Relay 13 isolates the subscriber's station equipment and connects capacitor 14 across the line so that a.c. transmission tests of the loop can be made from the central office by applying test signals from Tip or Ring to ground and receiving them on the opposite wire of the pair with respect to ground. Meanwhile, the central office battery is held on the loop to keep the system powered. This is the system's loopback mode.

After removal of the enabling tone, the control latch 20 keeps the loopback timer 19 advancing by disabling its reset input via the NOR gate 61. Operation of the control latch had changed the conditioning of the timer 19 so that it will provide an output at nominally 64 seconds after it was first allowed to advance. This output, when it occurs, clocks the control latch to the reset state, terminating the loopback interval so that it will have lasted nominally 60 seconds. The signal input to the control latch is low when this clock pulse occurs because the NAND gate 62, that provides the signal input to the control latch, is disabled whenever the control latch is on. Also, with the control latch off and with no enabling tone applied, loopback timer 19 is forced to its reset state and inhibited from advancing.

Loop power remains applied to the monitoring and timing circuits for a brief interval after relay 13 has been released. This power is held until transistor 67 operates briefly, by-passing the SCR 30 so that it will be left off when transistor 67 goes off. Transistor 67 operates when disconnect timer 21 reaches its programmed count. The disconnect timer 21 advances whenever the loopback timer 19 is inhibited from advancing. Time-out-speed-up latch 70 is a flip-flop which conditions the loopback timer to bypass a number of stages in order to provide a sub-second interval for its programmed count. Speed-up latch 70 is set to provide such an interval as a result of the control latch 20 having been on. Therefore, in less than a second after the control latch goes off, disconnect timer 21 provides an output signal that turns on transistor 67 long enough to divert current from SCR 30. When the output count advances to where the output signal goes low, transistor 67 goes off, removing all d.c. power from the tone detecting and timing circuits, and the circuit reverts to the Idle Mode.

Disconnect timer 21 performs the additional function of disconnecting d.c. power from the circuit if it has been connected as a result of signal energy being applied over the subscriber loop without being followed (or accompanied) by the appropriate enabling tone within a reasonable interval. The two latches 20 and 70 are forced to the reset state by the pulse generated by capacitor 72 and resistor 73 as power is connected when the SCR 30 is turned on. If no enabling tone is being applied, disconnect timer 21 will be allowed to advance. The time-out-speed-up latch 70 programs the disconnect timer to advance for a nominal 20 second interval before its output signal goes high, turning on transistor 67 and then turning off this transistor when the output goes low. Except for the interval provided by the disconnect timer, operation of the circuit is the same as when loopback is concluded and loop power is disconnected from the monitoring and timing circuits.

While the novel loopback circuit has been described with reference to a two wire telephone line those skilled in this art will have no difficulty in applying the circuit to a four wire line.

Having now described the invention what I desire to protect by letters patent is set forth in the following claims.

1. A telephone line loopback circuit for use in testing the line between the central office and a subscriber's equipment, which circuit is located at the subscriber's end of the line and adapted to be powered solely by the normal central office power supply, means normally maintaining the circuit disconnected from the office power supply, and means connecting the circuit to the office power supply as a result of receiving an a.c. signal transmitted over the telephone line.

2. A circuit for use in testing a subscriber's loop between the central office and a subscriber's equipment located at a remote point, said circuit being located at the remote point and adapted to be powered solely by the loop's normal d.c. power supply, means normally maintaining the circuit disconnected from the loop's d.c. power supply, means connecting the circuit to the loop's d.c. power supply as a result of receiving a.c. signal energy within a relatively broad frequency band, means disconnecting the subscriber's equipment from the line and terminating the line for transmission tests from the central office upon the receipt of an a.c. signal at a predetermined frequency for a predetermined time duration, and means disconnecting the circuit from the loop's d.c. power supply after it has been connected to said d.c. supply for a predetermined time period.

3. A telephone line loopback circuit for use in testing the line between the central office and a subscriber's equipment located at a remote point, which circuit comprises,
   a - circuit elements connecting the circuit across the line through a normally-open loop power switch,
   b - a signal energy detector connected to the line,
   c - means closing the said loop power switch when said signal energy detector receives a.c. signal energy within a relatively broad frequency band,
   d - a loopback timer,
   e - a tone detector connected to the line and turning on said loopback timer upon receipt of an a.c. enabling signal having a predetermined frequency,
   f - a control latch operable between a normal released position and a set position,
   g - means actuating the said control latch to the set position when the said tone detector turns on the said loopback timer for a predetermined minimum time duration,
   h - means retaining the said loopback timer in the on position for a predetermined additional time duration when the said control latch has been operated to the set position,
   i - a relay having a pair of normally-closed contacts connecting the subscriber's equipment to the telephone line and a pair of normally-open contacts,
   j - means energizing said relay during the time that said control latch is in the set position,
   k - an impedance connected across the line upon closure of the normally-open relay contacts, and
   l - means opening the said loop power switch after the said loopback timer has been on for the said predetermined additional time duration.

4. The invention as recited in claim 3, including means opening the said loop power switch when the said tone detector does not receive the said a.c. enabling signal within a predetermined time period after the said signal energy detector receives the said a.c. signal energy.

* * * * *